No. 663,567. Patented Dec. 11, 1900.
P. FRICHETTE.
PIPE WRENCH.
(Application filed Aug. 23, 1900.)

(No Model.)

Witnesses,

Inventor,
Petar Frichette
By Dewey Thong & Co.
Atty

UNITED STATES PATENT OFFICE.

PETAR FRICHETTE, OF SHERIDAN, CALIFORNIA.

PIPE-WRENCH.

SPECIFICATION forming part of Letters Patent No. 663,567, dated December 11, 1900.

Application filed August 23, 1900. Serial No. 27,812. (No model.)

*To all whom it may concern:*

Be it known that I, PETAR FRICHETTE, a citizen of the United States, residing at Sheridan, county of Placer, State of California, have invented an Improvement in Pipe-Wrenches; and I hereby declare the following to be a full, clear, and exact description of the same.

My invention relates to improvements in wrenches of that class which are designed for the turning of pipes, rods, and the like.

It consists of a jaw formed by first folding a sufficiently stout piece of iron or steel and welding the bight or fold together for a short distance and then bending the separated parts, so as to form an acute-angle space between the fold and the two separated portions of the bar. Holes are made through the two parallel separated portions, and a toothed or corrugated lever-arm is fulcrumed upon a pin passing through any one of these holes, depending upon the size of the pipe or rod which is to be operated upon. The angular space in the jaw admits of pipes or rods from one-fourth of an inch in diameter upward, and by moving the lever about its fulcrum it grasps the rod or pipe between its toothed end and the two angular sides of the space with such a grip as to enable the operator to turn the rod or pipe which is thus gripped.

The invention also comprises details of construction, which will be more fully explained by reference to the accompanying drawings, in which—

Figure 1:
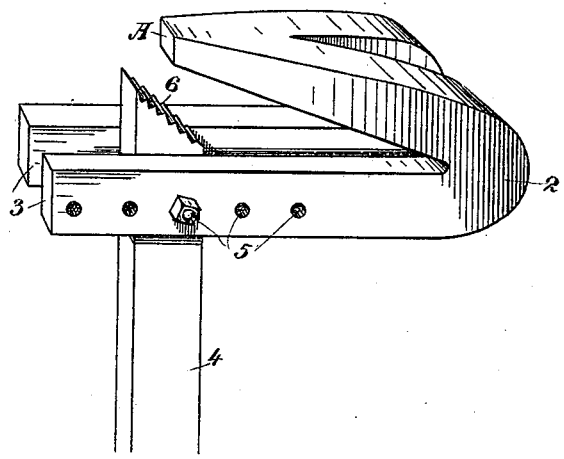
Figure 2:
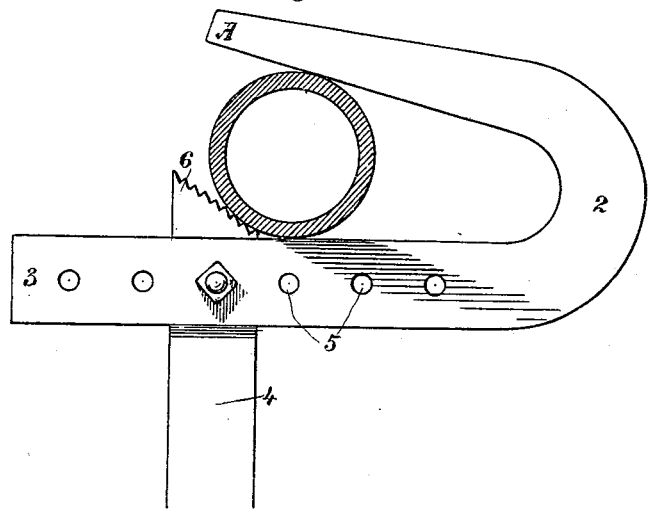

Figure 1 shows the smaller form of the wrench. Fig. 2 shows the larger form.

The jaws are formed by folding the flat iron or steel bar upon itself midway of the length, and the two sides may be welded or brought together for a short distance from the fold, this part being also tapered, if desired, as shown at A. Near the base of this portion the two sides of the bar begin to separate and are bent around, as shown at 2, so that the two separated parts extend parallel with each other and the parts A and 3 stand at an acute angle, so that any rod or pipe of less diameter than the widest space between A and 3 may be laid into this convergent opening and will rest against the two angular sides.

In order to grip the article firmly in place, I have shown a lever 4, which passes between the two sides 3 of the jaw and is pivoted by a bolt passing through any one of the holes 5. The end of the lever may be toothed or corrugated, as shown at 6. The point at which the lever is pivoted is dependent upon the diameter of the rod or pipe which is to be turned, and it will be manifest that the lever may be pivoted in any one of the holes 5 for that purpose, so that the lever will stand at such an angle with the part 2 3 that when turned about its fulcrum the toothed end will press against the rod or pipe, and thus force it strongly between the convergent jaws $A^2$ $3^2$ and will hold it with sufficient power, so that with a lever 4 of considerable length any rod or pipe may be turned. If it be screw-threaded and rusted or otherwise fixed in position, it may be turned and the threads loosened by this device.

I have shown two forms of the device, which are, however, equivalent. In Fig. 1 the jaws $A^2$ $3^2$ converge to almost a point at the inner end, and this size will be suitable for the smallest rods or pipes and from that up to a certain size, as one inch, more or less. In the form shown in Fig. 2 the curvature at 2 is made larger, so that the inner sides are joined by a considerable segment of a circle, and this form is intended to take the next size larger to what can be grasped by the first form, and thence extend up to the larger sizes. It will be manifest that both forms are alike in their operation, and the construction is only a matter of convenience in handling different sizes of pipe; but in any case the pipe or rod will have points of contact against the converging sides of the jaw, and the lever acts to compress the pipe against these contact-surfaces.

By forming one member of two parallel bars the separation of these bars provides two surfaces of contact on this side of the jaw and a space between in which the lever is fulcrumed, so as to stand opposite the solid member of the jaw and to exert its pressure against the three jaws thus formed in the most efficient manner.

Having thus described my invention, what I claim as new, and desire to secure by Letters Patent, is—

An improved pipe-wrench consisting of a single integral bar folded about midway upon itself to form converging jaws said bar split from a point commencing near the outer end of the folded portion so as to form two straight and parallel sides separated from each other, and provided with adjusting-holes, and a lever fulcrumed between said separated sides and having an end adapted to compress the pipe into the folded portion of the bar whereby the pipe has an independent contact upon the separated sides and a third point of contact on the overhanging folded portion.

In witness whereof I have hereunto set my hand.

PETAR FRICHETTE.

Witnesses:
GEO. H. STRONG,
S. H. NOURSE.